US009732664B2

(12) United States Patent
    Trinkel

(10) Patent No.: US 9,732,664 B2
(45) Date of Patent: Aug. 15, 2017

(54) IGNITION DEVICE WITH PRE-COMBUSTION CHAMBER

(71) Applicant: Caterpillar Energy Solutions GmbH, Mannheim (DE)

(72) Inventor: Ralf Trinkel, Frankenthal (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 49 days.

(21) Appl. No.: 14/801,106

(22) Filed: Jul. 16, 2015

(65) Prior Publication Data

US 2016/0024995 A1    Jan. 28, 2016

(30) Foreign Application Priority Data

Jul. 22, 2014   (EP) ..................... 14178054

(51) Int. Cl.
    *F02B 19/12*        (2006.01)
    *F02M 57/06*        (2006.01)
    (Continued)

(52) U.S. Cl.
    CPC .......... *F02B 19/12* (2013.01); *F02B 19/1004* (2013.01); *F02B 19/108* (2013.01); *F02B 19/16* (2013.01); *F02M 21/0275* (2013.01); *F02M 57/06* (2013.01); *F02M 61/168* (2013.01); *F02P 13/00* (2013.01); *F02M 2200/8015* (2013.01);
    (Continued)

(58) Field of Classification Search
    CPC ...... F02B 19/00; F02B 19/1004; F02B 19/12; F02B 19/16; F02B 19/108; F02P 13/00
    See application file for complete search history.

(56) References Cited

U.S. PATENT DOCUMENTS

| 4,218,992 A | 8/1980 | Latsch et al. |
| 5,203,298 A | 4/1993 | Manolis |
| (Continued) | | |

FOREIGN PATENT DOCUMENTS

| DE | 3230793 A1 | 2/1984 |
| EP | 2735717 A2 | 5/2014 |
| (Continued) | | |

OTHER PUBLICATIONS

European Search Report dated Oct. 20, 2014, in EP Application 14178054.4 (3 pages).

*Primary Examiner* — Hung Q Nguyen
*Assistant Examiner* — Xiao Mo

(57) ABSTRACT

An ignition device with a pre-combustion chamber for an internal combustion engine is disclosed. The internal combustion engine may have a plurality of cylinders. Each cylinder may define a main combustion chamber. The ignition device may have a first pre-combustion chamber part configured to at least partially accommodate a spark plug. The ignition device may also have a second pre-combustion chamber part defining at least a portion of the pre-combustion chamber. The second pre-combustion chamber part may include at least one orifice configured to be fluidly connected to the main combustion chamber. The second pre-combustion chamber part may be detachably mountable to the first pre-combustion chamber part, such that the first and second pre-combustion chamber parts are axially secured to one another and rotatable with respect to one another.

20 Claims, 9 Drawing Sheets

(51) Int. Cl.
  *F02B 19/10* (2006.01)
  *F02M 21/02* (2006.01)
  *F02B 19/16* (2006.01)
  *F02P 13/00* (2006.01)
  *F02M 61/16* (2006.01)
(52) U.S. Cl.
  CPC .... *F02M 2200/8076* (2013.01); *Y02T 10/125* (2013.01); *Y02T 10/32* (2013.01)

(56) References Cited

U.S. PATENT DOCUMENTS

| | | | |
|---|---|---|---|
| 5,662,082 A * | 9/1997 | Black | F02B 19/1009 123/254 |
| 5,915,351 A | 6/1999 | Regueiro | |
| 6,016,785 A | 1/2000 | Divecha et al. | |
| 7,270,107 B2 | 9/2007 | Riggs | |
| 8,350,457 B2 | 1/2013 | Thomas et al. | |
| 2007/0236122 A1 | 10/2007 | Borror | |
| 2009/0107439 A1* | 4/2009 | Schultz | F02P 9/007 123/146.5 R |
| 2010/0132660 A1* | 6/2010 | Nerheim | F02B 19/1014 123/260 |
| 2012/0103302 A1* | 5/2012 | Attard | F02B 19/12 123/260 |
| 2012/0285408 A1* | 11/2012 | Richter | F01L 13/0036 123/90.17 |
| 2013/0139784 A1* | 6/2013 | Pierz | F02B 19/16 123/254 |

FOREIGN PATENT DOCUMENTS

| | | |
|---|---|---|
| FR | 2311927 | 12/1976 |
| WO | WO 2011/101541 A1 | 8/2011 |
| WO | WO 2012/088551 A1 | 7/2012 |

* cited by examiner

IGNITION DEVICE WITH PRE-COMBUSTION CHAMBER

CLAIM FOR PRIORITY

This application claims benefit of priority of European Patent Application No. 14178054.4, filed Jul. 22, 2014, which is incorporated herein by reference.

TECHNICAL FIELD

The present disclosure relates to an ignition device for an internal combustion engine. The present disclosure further relates to a method for assembling an ignition device of an internal combustion engine. Additionally, the present disclosure relates to a pre-combustion chamber part of an ignition device.

BACKGROUND

Internal combustion engines running at least in part on gaseous fuel usually need an ignition device to ignite the mixture of gaseous fuel and air. An ignition device including a pre-combustion chamber may have a spark plug partially protruding into the pre-combustion chamber. Such an ignition device may further include a fuel supply for supplying some amount of gaseous fuel into the pre-combustion chamber. Upon ignition of the mixture of gaseous fuel and air within the pre-combustion chamber, the flames may advance through orifices provided in the pre-combustion chamber into the main combustion chamber, where the flames may ignite the main amount of gaseous fuel and air for operating the internal combustion engine.

The present disclosure is directed, at least in part, to improving or overcoming one or more aspects of prior systems.

SUMMARY OF THE DISCLOSURE

According to an aspect of the present disclosure, an ignition device with a pre-combustion chamber of an internal combustion engine having a plurality of cylinders each defining a main combustion chamber is disclosed. The ignition device may comprise a first pre-combustion chamber part configured to at least partially accommodate a spark plug. The ignition device may further comprise a second pre-combustion chamber part defining at least a portion of the pre-combustion chamber and including at least one orifice configured to be fluidly connected to the main combustion chamber. The second pre-combustion chamber part may be detachably mountable to the first pre-combustion chamber part, such that the first and second pre-combustion chamber parts are axially secured to one another and rotable with respect to one another.

According to a further aspect of the present disclosure, a pre-combustion chamber part of an ignition device according to the present disclosure is disclosed. The pre-combustion chamber part may define at least a portion of a pre-combustion chamber and may comprise a plurality of orifices fluidly connecting the pre-combustion chamber with the main combustion chamber. The pre-combustion chamber part may further comprise an annular protrusion for connecting to another pre-combustion chamber part. The annular protrusion may have an axial locking device configured to, when the pre-combustion chamber part may be mounted to the other pre-combustion chamber part, axially secure the pre-combustion chamber part to the other pre-combustion chamber part and to allow for rotataional movement of the pre-combustion chamber part with respect to the other pre-combustion chamber part.

In some embodiments, the ignition device may further comprise a positioning device provided at an interface between the first and second pre-combustion chamber parts. The positioning device may be configured to, when the first and second pre-combustion chamber parts may be in a pre-determined position to one another, inhibit rotational movement of the second pre-combustion chamber part relative to the first pre-combustion chamber part.

In some embodiments, the pre-combustion chamber part may comprise a positioning device provided at the annular protrusion. The positioning device may be configured to, when the pre-combustion chamber part is in a pre-determined position with respect to the other pre-combustion chamber part, inhibit rotational movement of the second pre-combustion chamber part relative to the first pre-combustion chamber part.

In some embodiments, the first pre-combustion chamber part may define at least a portion of the pre-combustion chamber.

In some embodiments, the second pre-combustion chamber part may define the entire pre-combustion chamber. In such embodiments, the first pre-combustion chamber part may neither define nor include a portion of the pre-combustion chamber.

Other features and aspects of this disclosure will be apparent from the following description and the accompanying drawings.

DETAILED DESCRIPTION

Figure 1:
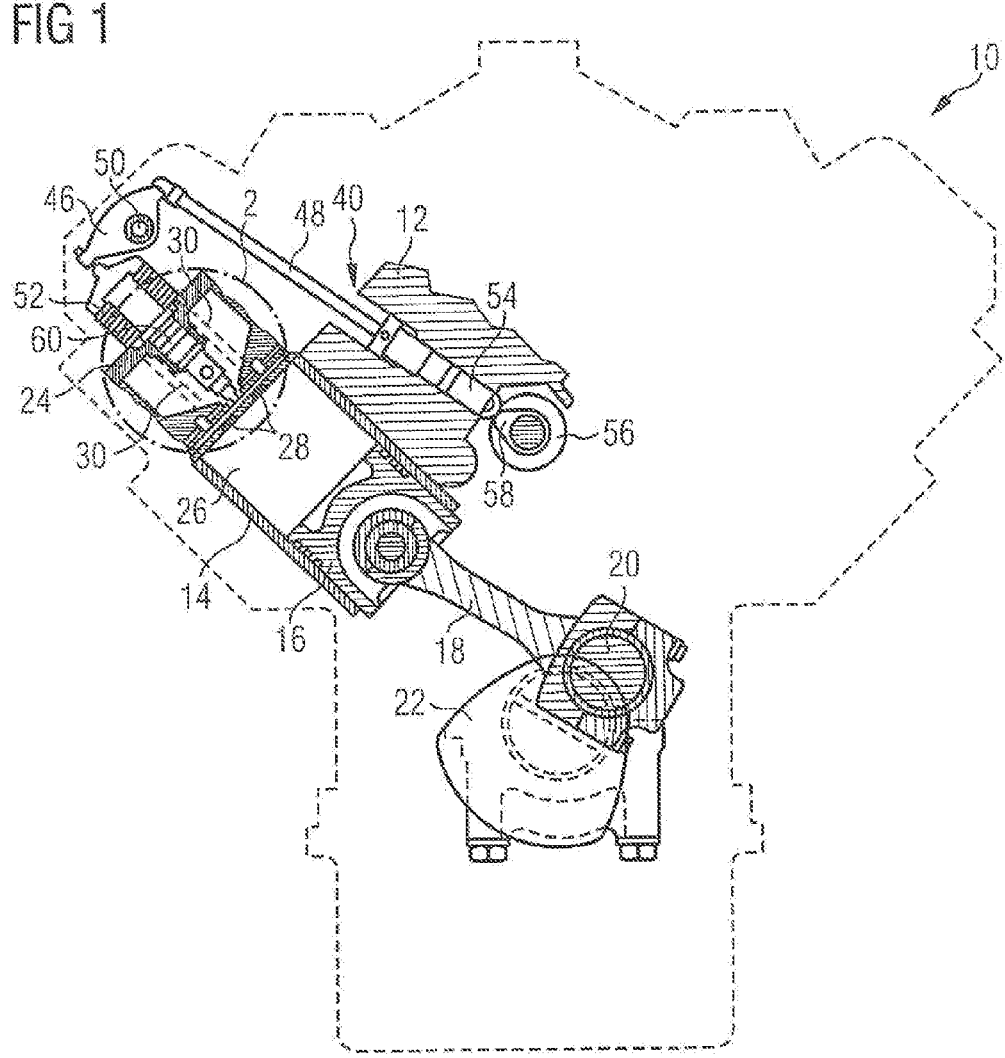
FIG. 1 is a diagrammatic cross-sectional view of an internal combustion engine with an ignition device of the present disclosure shown installed in a cylinder head of the internal combustion engine.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based at least in part on the realization that an ignition device can be assembled and disassembled without the need of a separate tool. Particularly, providing first and second pre-combustion chamber parts assembled together for forming the ignition device via, for instance, engageable threads or a bayonet may provide the possibility to assemble and disassemble the ignition device without a specific tool. Further, when disassembling the ignition device, it may be assured that the single parts of the ignition device may not be damaged and, thus, some parts of the ignition device may be re-used. This may be especially advantageous in a maintenance event when, for example, the pre-combustion chamber part protruding into the main combustion chamber is attrited. For example, the disclosed ignition device may assure that the pre-combustion chamber part including the pre-combustion chamber tip may remain at the ignition device, also when forcibly detaching the ignition device from the cylinder head.

The present disclosure may be based at least in part on the realization that two pre-combustion chamber parts of an ignition device can be pre-assembled, such that the two pre-combustion chamber parts are axially secured to each other and rotational movement between the two pre-combustion chamber parts can be inhibited. After pre-assembling, the ignition device may be installed in the cylinder head in a desired position and with a desired orientation of the orifices provided at the ignition device and configured to fluidly connect the pre-combustion chamber with the main combustion chamber.

Referring now to the drawings, an exemplary embodiment of an internal combustion engine 10 is illustrated in FIG. 1. The internal combustion engine 10 may include features not shown, such as fuel systems, air systems, cooling systems, peripheries, drivetrain components, turbochargers, etc. For the purposes of the present disclosure, the internal combustion engine 10 is considered a four-stroke gaseous fuel internal combustion engine. One skilled in the art will recognize, however, that the gaseous fuel internal combustion engine 10 may be any type of engine (turbine, gas, diesel, natural gas, propane, etc.) that would utilize a pre-combustion chamber. Furthermore, the internal combustion engine 10 may be of any size, with any number of cylinders, and in any configuration ("V," in-line, radial, etc.). The internal combustion engine 10 may be used to power any machine or other device, including locomotive applications, on-highway trucks or vehicles, off-highway trucks or machines, earth moving equipment, generators, aerospace applications, marine applications, pumps, stationary equipment, or other engine powered applications.

The internal combustion engine 10 may include an engine block 12 having a plurality of cylinders 14 (one of which is illustrated in FIG. 1). A piston 16 may be slidably disposed within the cylinder 14 to reciprocate between a top-dead-center position and a bottom-dead-center position. A connecting rod 18 may connect the piston 16 to an eccentric crankpin 20 of a crankshaft 22 such that reciprocating motion of the piston may result in rotation of the crankshaft 22.

The internal combustion engine 10 may also include a cylinder head 24 engaged with the engine block 12 to cover the cylinder 14, thereby delimiting a main combustion chamber 26. The cylinder head 24 may define intake and exhaust openings 28 that may allow intake gases into the main combustion chamber 26 and exhaust gases out of the main combustion chamber 26, respectively. Engine valves 30 may be positioned to selectively open and close the openings 28. Each cylinder 14 may include multiple intake and exhaust openings 28.

The internal combustion engine 10 may include a series of valve actuation assemblies 40 (one of which is illustrated in FIG. 1). The multiple valve actuation assemblies 40 may be provided per cylinder 14. For example, one valve actuation assembly may be used to open and close the intake valves and another valve actuation assembly may be provided to open and close the exhaust valves.

The valve actuation assembly 40 may include a rocker arm 46. The rocker arm 46 may be pivotally mounted in the cylinder head 24 and may attach to the engine valves 30 at one end and may attach to a push rod 48 at the other end. Oscillation of rocker arm 46 about its pivot point 50 may cause the valves 30 to move between an open position and a closed position. The valve actuation assembly 40 may also include valve springs 52 that may bias the valves 30 toward the closed position (i.e. closing the intake and exhaust openings 28).

The other end of the push rod 48 may engage a lifter 54 which may engage a camshaft 56. The camshaft 56 may operatively engage the crankshaft 22. The camshaft 56 may be connected with crankshaft 22 in any manner readily apparent to one skilled in the art where rotation of the crankshaft 22 may result in rotation of the camshaft 56. For example, camshaft 56 may be connected to crankshaft 22 through a gear train (not shown).

As shown in FIG. 1, a first cam lobe 58 may be disposed on the camshaft 56 to engage the lifter 54. One skilled in the art may recognize that the camshaft 56 may include additional cam lobes to engage with other lifters in order to actuate additional engine valves.

The internal combustion engine 10 may also include an ignition device 60 (also referred to as pre-combustion chamber ignition device), which is positioned within the cylinder head 24 between the valves 30. The ignition device 60 may be configured in a variety of ways. Any assembly capable of being positioned in the cylinder head 24 to support a combustion event outside of the main combustion chamber 26, and direct the combustion into the main combustion chamber 26 may be used.

Figure 2:
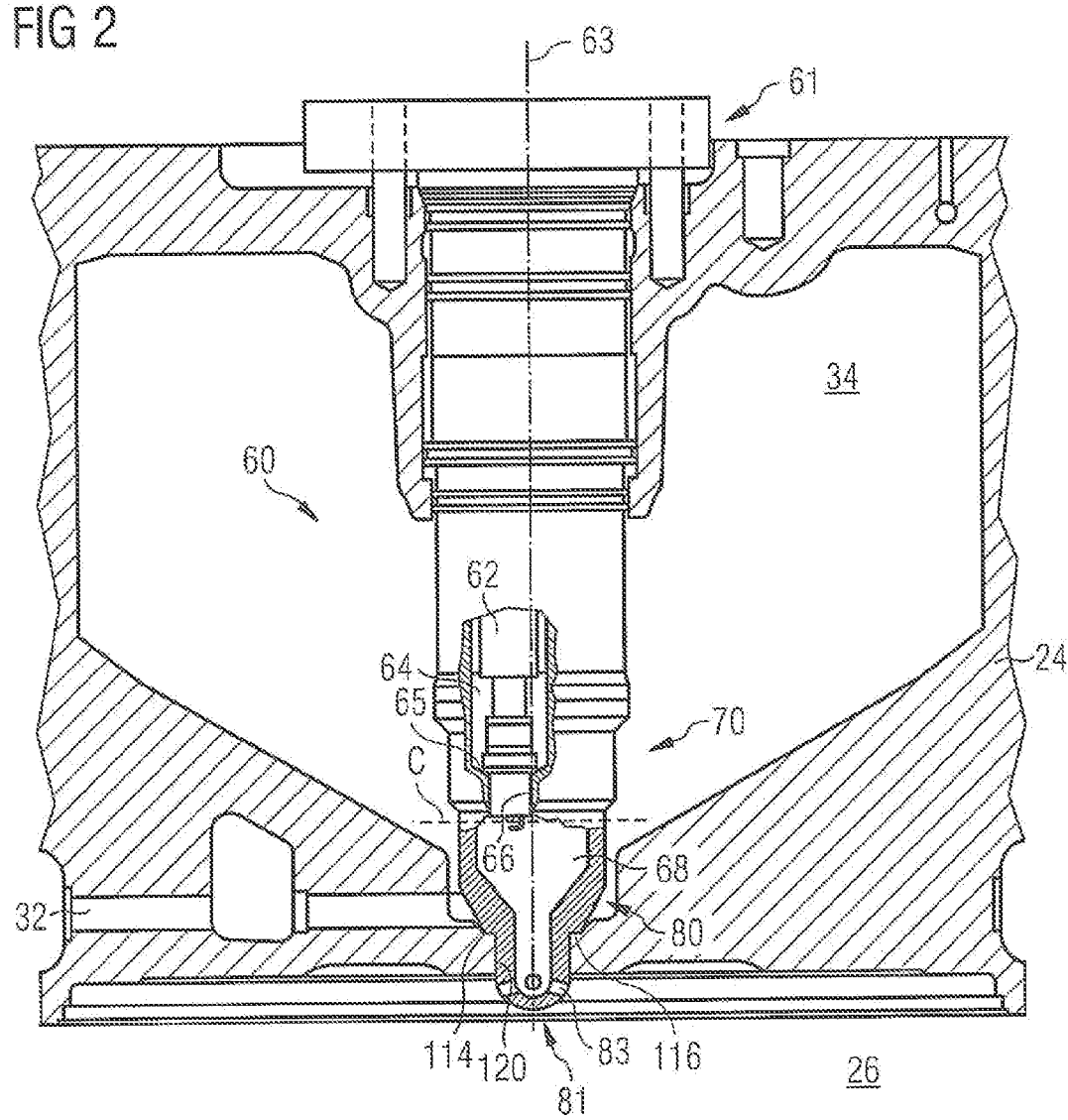
FIG. 2 is a diagrammatic cross-sectional view of the ignition device of FIG. 1 shown in greater detail.

With reference to FIG. 2, the ignition device 60 is shown in greater detail. The ignition device 60 defining a longitudinal axis 63 may extend from the cylinder head 24 into the main combustion chamber 26. In the depicted embodiment, the ignition device 60 may comprise a first pre-combustion chamber part 70 and a second pre-combustion chamber part 80 assembled to the first pre-combustion chamber part 70. As illustrated in FIG. 1, the first pre-combustion chamber part 70 is disposed above the second pre-combustion chamber part 80. In FIG. 2, a separation between the first pre-combustion chamber part 70 and the second pre-combustion chamber part 80 is indicated by a dotted line C.

The ignition device 60 may be attached to the cylinder head 24 via, for example, a fastening device 61. In the assembled state, the fastening device 61 may at least partially press the ignition device 60 towards the main combustion chamber 26 (in FIG. 2 in a downward direction). On the opposite side, the ignition device 60 contacts a flange 114, such that the first and second pre-combustion chamber parts 70, 80 are at least partially compressed, thereby forming a robust device. In this state, the first and second pre-combustion chamber parts 70, 80 are relatively fixed to one another with respect to axial displacement and rotation. The first pre-combustion chamber part 70 may be generally cylindrical and may be made of any suitable material.

The flange 114 may be sealed against the main combustion chamber 26. The flange 114 may extend transversely relative to the longitudinal axis 63 and may be provided to seal against a sealing surface 116 provided in the cylinder head 24 to prevent leakage between the main combustion chamber 26 and first and second cooling fluid passages 32, 34.

The first pre-combustion chamber part 70 may be configured to accommodate a spark plug 62 therein such that a sparking end of the spark plug 62 at least partially protrudes into a pre-combustion chamber 68 provided within the ignition device 60. The spark plug 62 in the context of this invention may mean any suitable ignition device available in the art.

Figure 3:
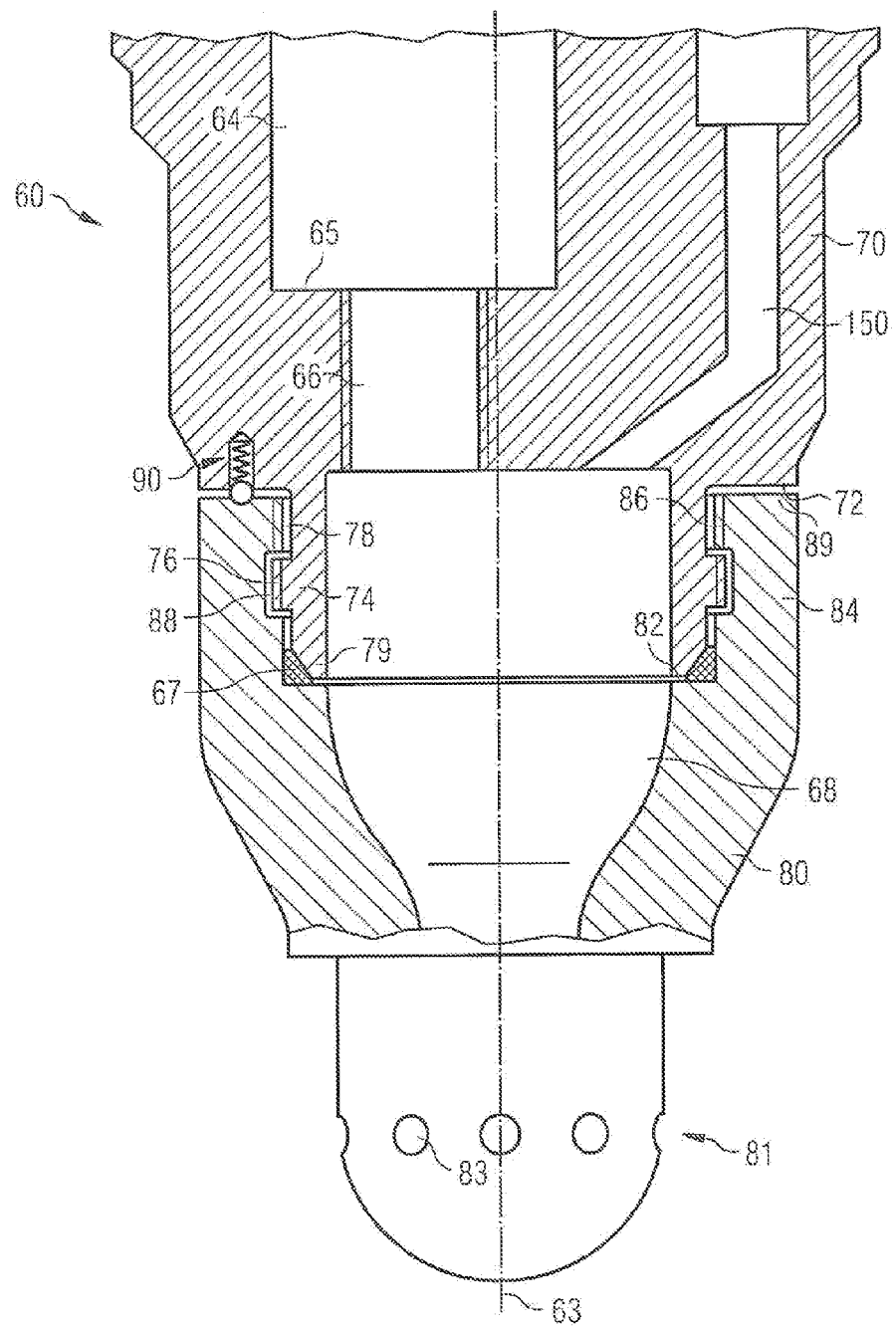
FIG. 3 is a diagrammatic, partial cut view of a first embodiment of the ignition device according to the present disclosure.
Figure 4:
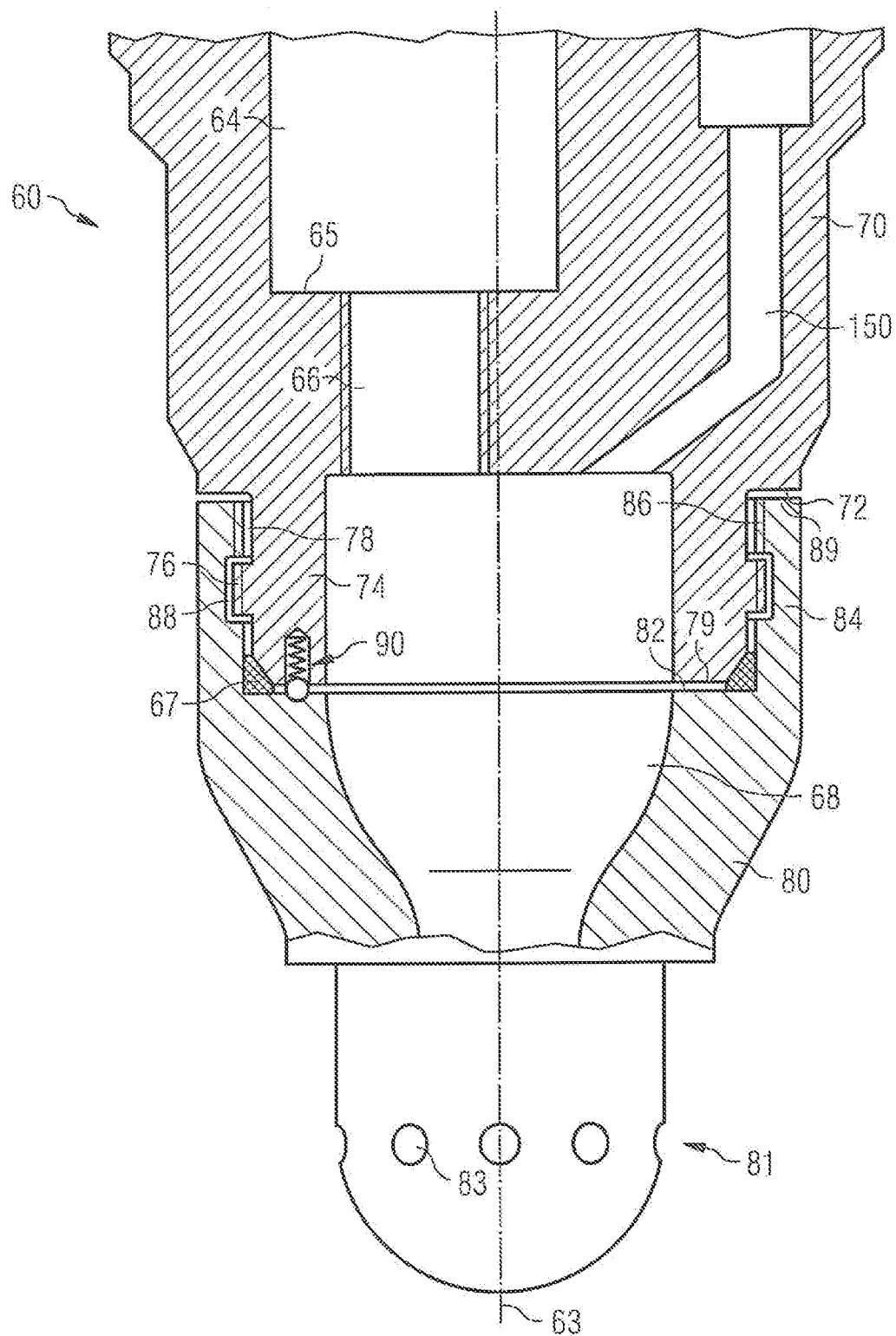
FIG. 4 is a diagrammatic, partial cut view of another embodiment of the ignition device according to the present disclosure.

The second pre-combustion chamber part 80 may be generally cylindrical and is mountable to the first pre-combustion chamber part 70, which is described in greater detail with respect to FIGS. 3 and 4. Preferably, the second pre-combustion chamber part 80 may be detachably mountable to the first pre-combustion chamber part 70. This may allow replacing of the second pre-combustion chamber part 80 by a new second pre-combustion chamber part in the case of wear of the second pre-combustion chamber part 80, especially in the case of wear of a pre-combustion chamber tip 81 or the orifices 83. For instance, after a usage time of, for example, about 15.000 hours of engine operation, the second pre-combustion chamber part 80 may be replaced. The second pre-combustion chamber part 80 may be preferably cast to the general configuration and subsequently machined to final dimensions where required.

The first pre-combustion chamber part 70 may have a stepped bore 64 that may be adapted to receive the spark plug 62. The stepped bore 64 may have a spark plug mounting bore 66 adapted to receive an end of the spark plug 62. The spark plug mounting bore 66 may include a thread adapted to mate with threads on the end of the spark plug 62. The stepped bore 64 may define a sealing surface 65 that may be adapted to sealingly contact the spark plug 62.

Referring to FIG. 3, a detailed partial cut view of the ignition device 60 is illustrated. The second pre-combustion chamber part 80 includes a pre-combustion chamber tip 81 which is generally cylindrical and which may at least partially protrude into the main combustion chamber 26 through a bore 120 provided in the cylinder head 24.

The first pre-combustion chamber part 70 and the second pre-combustion chamber part 80 may define a pre-combustion chamber 68 disposed therein. The electrode end of the spark plug 62 may at least partially protrude into the pre-combustion chamber 68.

The pre-combustion chamber tip 81 having a substantially dome-like shape may include a plurality of spaced apart, radially oriented orifices 83. The plurality of orifices 83 may fluidly interconnect the pre-combustion chamber 68 and the main combustion chamber 26 to one another. The plurality of orifices 83 may be configured to direct burning fuel, for example, expanding gases from the pre-combustion chamber 68 in a predetermined pattern into the main combustion chamber 26 and to direct an air/fuel mixture from the main combustion chamber 26 into the pre-combustion chamber 68.

The second pre-combustion chamber part 80 may be made from a high temperature material. For example, a high temperature, thermally stable and environmentally resistant alloy, such as, a nickel-chromium-tungsten-molybdenum alloy may be suitable. It may be understood that other high temperature materials of suitable composition may be substituted without departing from the present disclosure. The pre-combustion chamber tip 81 may be cast or machined from, for instance, bar stock.

As further shown in FIG. 3, the first pre-combustion chamber part 70 may include a fuel supply connection 150 fluidly connected to the pre-combustion chamber 68 and to a fuel system (not explicitly shown in the drawings). The fuel supply connection 150 may be configured to receive, for example, gaseous fuel and may then supply the gaseous fuel into the pre-combustion chamber 68. The fuel supply connection 150 may be further configured to accommodate a control valve (not explicitly shown in FIG. 3) for controlling the supply of the gaseous fuel amount into the pre-combustion chamber 68.

As illustrated in FIG. 3, the first pre-combustion chamber part 70 is detachably mountable to the second pre-combustion chamber part 80. The first pre-combustion chamber part 70 has a first end flange 72 from which a first annular protrusion 74 extends. The first annular protrusion 74 delimits at least partially a portion of the pre-combustion chamber 68 therein. A first thread 76 and a first thread undercut 78 are provided at an outer circumferential surface of the first annular protrusion 74. The first thread undercut 78 is proximally located with respect to the first end flange 72, whereas the first thread 76 is distally located with respect to the first end flange 72. The first annular protrusion 74 further includes a first end portion 79 facing towards the pre-combustion chamber tip 81.

The second pre-combustion chamber part 80 has a second end flange 82 from which a second annular protrusion 84 extends. The second annular protrusion 84 delimits at least partially a portion of the pre-combustion chamber 68 therein. A second thread 86 and a second thread undercut 88 are provided at an inner circumferential surface of the second annular protrusion 84. The second thread undercut 88 is proximally located with respect to the second end flange 82, whereas the second thread 86 is distally located with respect to the second end flange 82. The second annular protrusion further includes a second end portion 89 facing towards the first pre-combustion chamber part 70.

As depicted in FIG. 3, the inner and outer diameters of the first annular protrusion 74 and the second annular protrusion 84 are selected, such that the first annular protrusion 74 is at least partially inserted into the second annular protrusion 84 and that the first thread 76 is engageable with the second thread 86. After having the first pre-combustion chamber part 70 and the second pre-combustion chamber part 80 assembled, the first and second threads 76, 86 are out of engagement. In this state, the first thread 76 is at least partially located in the second thread undercut 88 and that the second thread 86 is at least partially located in the first thread undercut 78. In such position, the first pre-combustion chamber part 70 is freely rotatable with respect to the second pre-combustion chamber part 80, but axially secured to one another, such that the second pre-combustion chamber part 80 may not fall off the first pre-combustion chamber part 70.

The first and second threads 76, 86 may be usual threads, such as, for instance, a metric thread having an appropriate strength. The first and second threads 76, 86 may include at least one convolution, such that, after the first and second threads 76, 86 are out of engagement, the first and second pre-combustion chamber parts 70, 80 are axially secured to one another and may not disengage under influence of, for instance, gravity or any axial force, especially axial forces applied to the ignition device 60 during assembling or disassembling.

For relatively aligning the first pre-combustion chamber part 70 to the second pre-combustion chamber part 80, a positioning device 90 is provided at an interface between the first end flange 72 of the first pre-combustion chamber part 70 and the second end portion 89 of the second pre-combustion chamber part 80 facing each other. Particularly, the positioning device 90 is configured to relatively fix and position the first pre-combustion chamber part 70 to the second pre-combustion chamber part 80, such that the first pre-combustion chamber part 70 is inhibited from rotation relative to the second pre-combustion chamber part 80. The positioning device 90 is described in greater detail below with reference to FIGS. 7 to 9.

For sealing the pre-combustion chamber 68 at the interface between the first pre-combustion chamber part 70 and the second pre-combustion chamber part 80, a sealing member 67 may be provided. The sealing member 67 may seal the first thread 76 and the second thread 86 from the pre-combustion chamber 68. The sealing member 67 may be a sealing ring formed from steel.

Referring to FIG. 4, another embodiment of the ignition device 60 is illustrated. The ignition device 60 of FIG. 4 is substantially identical with the ignition device 60 of FIG. 3, but with the positioning device 90 provided at an interface between the second end flange 82 of the second pre-combustion chamber part 80 and the first end portion 79 of the first pre-combustion chamber part 70.

Figure 5:
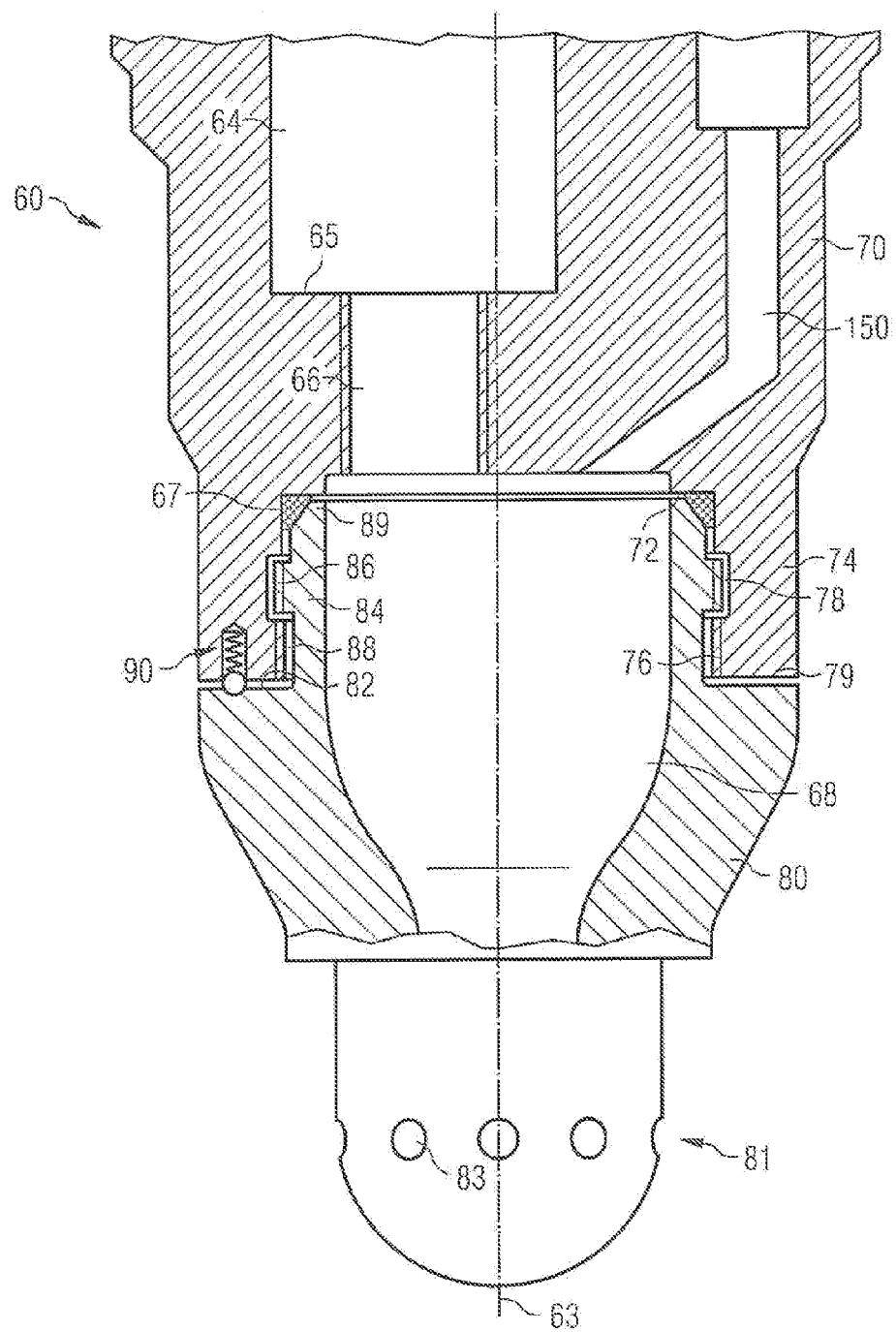
FIG. 5 is a diagrammatic, partial cut view of another embodiment of the ignition device according to the present disclosure.

With reference to FIG. 5, another embodiment of the ignition device 60 is illustrated. The ignition device 60 of FIG. 5 is similar to the ignition device 60 of FIG. 3, but differs in that the outer and inner diameters of the first and second annular protrusions 74, 84 are selected, such that the second annular protrusion 84 is inserted into the first annular protrusion 74. In such case, and as shown in FIG. 5, the positioning device 90 is provided at an interface between the first end portion 79 of the first pre-combustion chamber part 70 and the second end flange 82 of the second pre-combustion chamber part 80.

Figure 6:
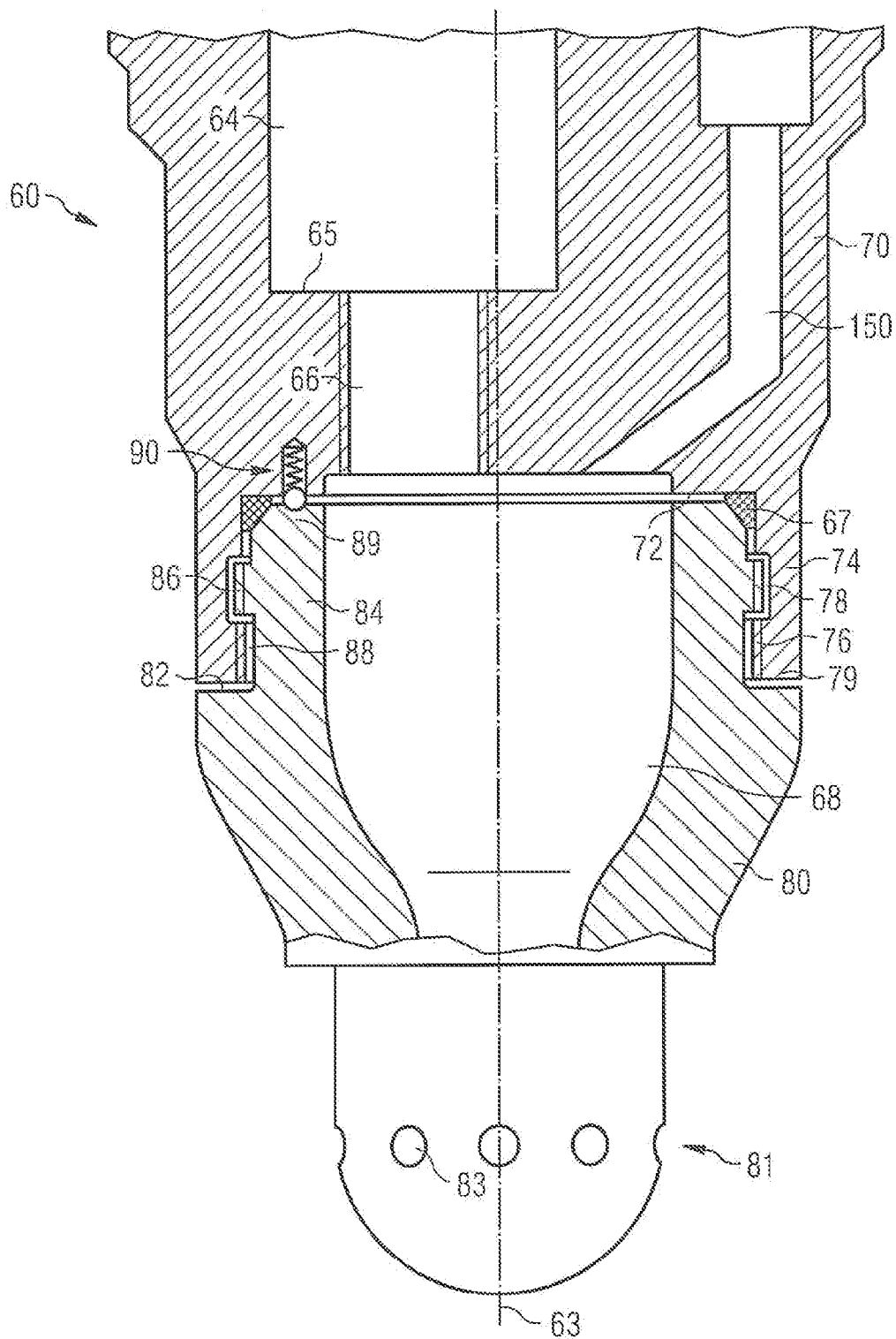
FIG. 6 is a diagrammatic, partial cut view of another embodiment of the ignition device according to the present disclosure.

Referring to FIG. 6, another embodiment of the ignition device 60 is illustrated. The ignition device 60 of FIG. 6 is substantially identical with the ignition device 60 of FIG. 5, but with the positioning device 90 provided at an interface between the second end portion 89 of the second pre-combustion chamber part 80 and the first end flange 72 of the first pre-combustion chamber part 70.

Figure 7:
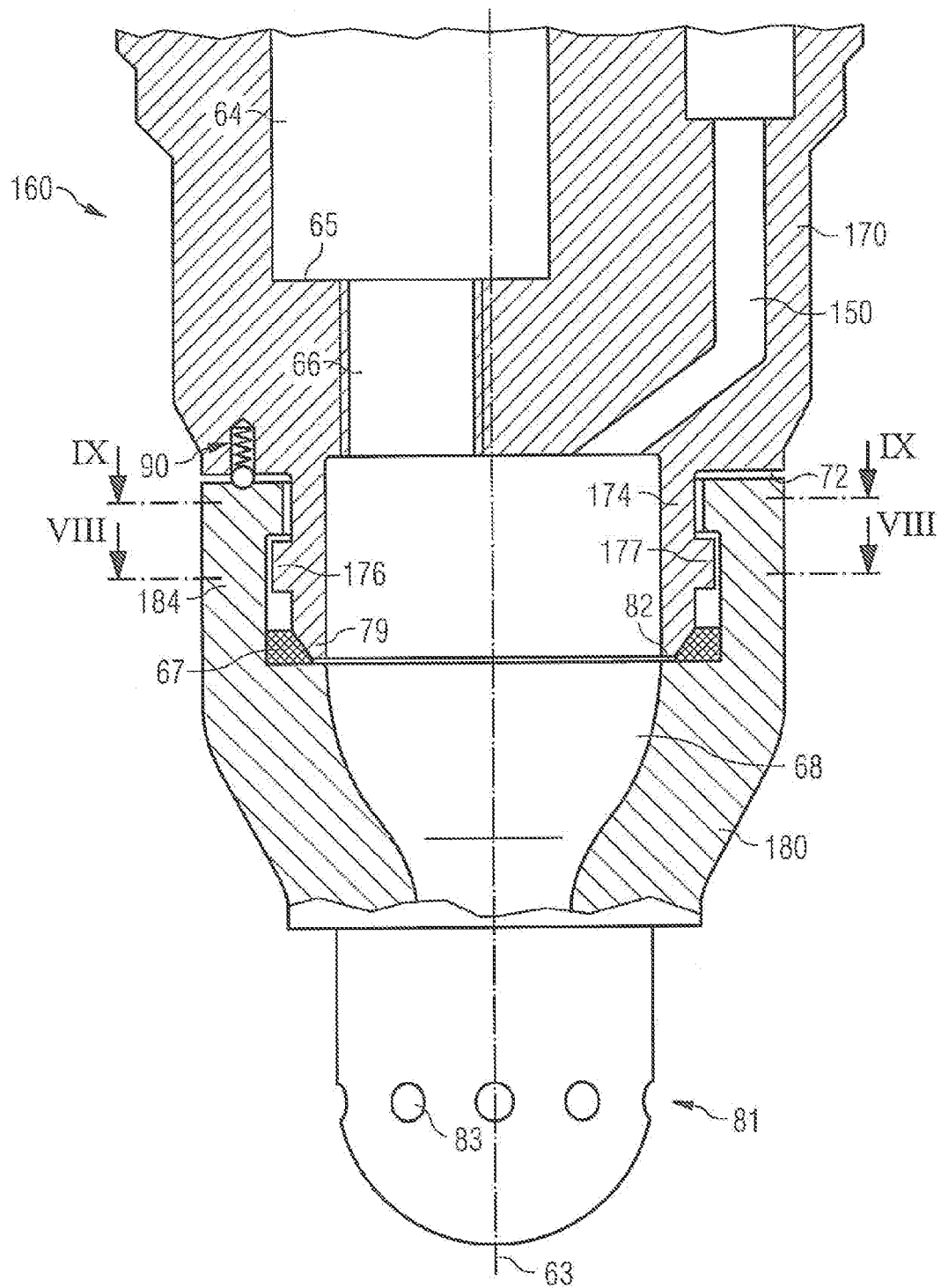
FIG. 7 is a diagrammatic, partial cut view of another embodiment of the ignition device according to the present disclosure.

With reference to FIG. 7, another embodiment of an ignition device 160 is illustrated. The ignition device 160 of FIG. 7 is similar to the ignition device 60 of FIG. 3, but includes a bayonet axially locking configuration. Thus, the ignition device of FIG. 7 has different configurations of the first and second annular protrusions 174, 184. As shown in FIG. 7, the first annular protrusion 174 includes a first radially projecting jut 176 and a second radially projecting jut 177 opposite to the first radially projecting jut.

Figure 8:
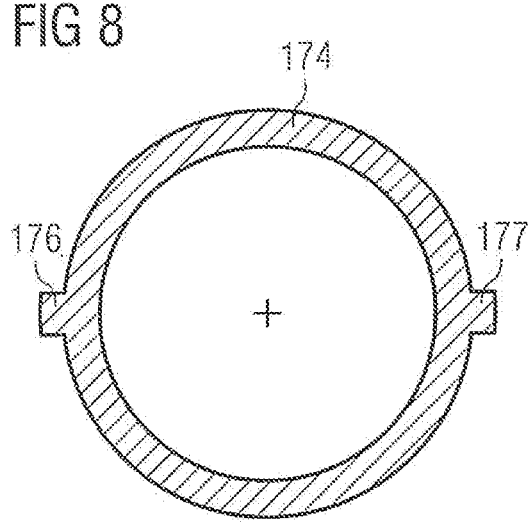
FIG. 8 is a cut view through a first pre-combustion chamber part taken along line XIII-XIII of FIG. 7.

Referring to FIG. 8, a cut view through the second pre-combustion chamber part 180 taken along line VIII-VIII of FIG. 7 is illustrated. For the sake of clarity, the first pre-combustion chamber part 170 is hidden in FIG. 8. As can be seen, the second annular protrusion 184 includes a first groove 186 and a second groove 187 opposite to the first groove 186.

Figure 9:
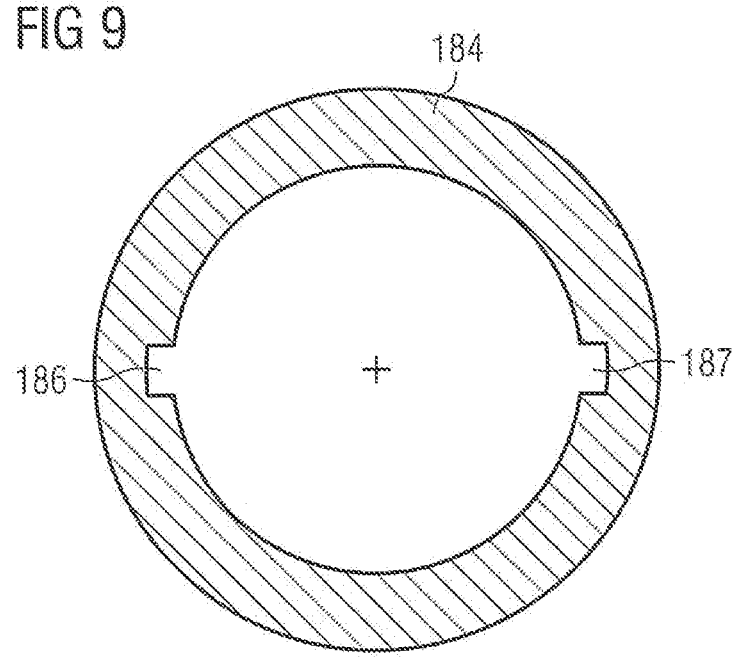
FIG. 9 is a cut view through a second pre-combustion chamber part taken along line IX-IX of FIG. 7.

Referring to FIG. 9, a cut view through the first pre-combustion chamber part 170 taken along line IX-IX of FIG. 7 is illustrated. For the sake of clarity, the second pre-combustion chamber part 180 is hidden in FIG. 9. As can be seen, the first annular protrusion 174 includes the first and second radially projecting juts 176, 177 on opposite sides.

With reference to FIGS. 7 to 9, it can be seen that the first and second grooves 186, 187 have a shape and are arranged such that the first and second grooves 186, 187 are engageable with the first and second juts 176, 177. In some embodiments, there may be only one radially projecting jut and only one groove engageable with the one jut.

As shown in FIG. 7, the first and second annular protrusions 174, 184 are rotated such that the positioning device 90 rotatably locks the first and second pre-combustion chamber parts 170, 180 to one another. The dimensions of the first and second juts 176, 177 and of the first and second grooves 186, 187 are selected in a manner, such that the axial and radial clearances of the first and second pre-combustion chamber parts 170, 180 mounted to one another is at a minimum.

In some embodiments, the at least one jut 176, 177 may be provided at the second annular protrusion 184, whereas the at least one groove 186, 187 may be provided at the first annular protrusion 174.

In some embodiments, referring to FIGS. 3 to 7, instead of providing the positioning device 90 at an interface between the end flange 72 and the end portion 89 or between the end flange 82 and the end portion 79, the positioning device 90 may be provided at an interface between an outer peripheral side of the first annular protrusion 74 and an inner peripheral side of the second annular protrusion 84 or between an inner peripheral side of the first annular protrusion 74 and an outer peripheral side of the second annular protrusion 84.

In some embodiments, referring to FIGS. 3 to 7, the second pre-combustion chamber part 80 may be configured to define and include the entire pre-combustion chamber 68. In such embodiments, the first pre-combustion chamber part 70 may neither define nor include a portion of the pre-combustion chamber 68, such that the interface between the first and second pre-combustion chamber parts 70, 80 and, hence, the positioning device 90 may be located at an more upper portion of the ignition device 60 in FIGS. 3 to 7, for example, above the pre-combustion chamber 68 at an axial position in the vicinity of the stepped bore 64. In such embodiments, a separate sealing member 67 may not be necessary, as the pre-combustion chamber 68 is completely provided within the second pre-combustion chamber part 80 and sealed via, for example, the spark plug 62 sealingly received by the spark plug mounting bore 66. In such embodiment, the spark plug mounting bore 66 may also be provided at the second-pre-combustion chamber part 80, which may also define at least a portion of the fuel supply connection 150.

Figure 10:
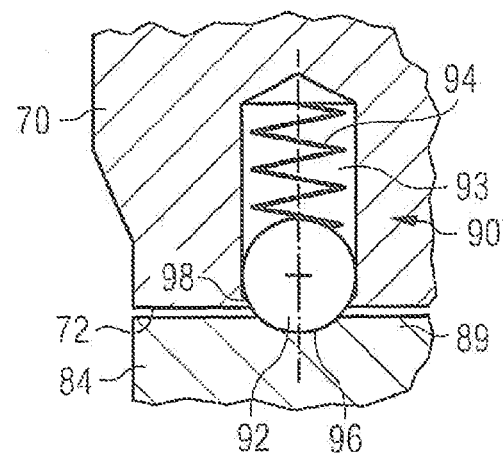
FIG. 10 is a detailed view of a first embodiment of a positioning device of the ignition device of FIGS. 3 and 4 shown in greater detail.

With respect to FIG. 10, a first embodiment of the positioning device 90 is shown in greater detail. The positioning device 90 includes a locking element 92 movable within a first recess 93 provided, for example, in the first pre-combustion chamber part 70 at the first end flange 72. In the embodiment shown in FIG. 7, the locking element 92 is a spherical element movable within the first recess 93 constituted by, for example, a bore. The locking element 92 is configured to at least partially project out of the first recess 93 and to be pre-stressed in a direction out of the first recess 93 by a tensioning member 94, such as, for example, a spiral spring disposed within the first recess 93.

A second recess 96 is provided in the second end portion 89 of the second pre-combustion chamber part 80 at a position opposite to the locking element 92. The second recess 96 has a shape substantially matching with the locking element 92 and is configured to at least partially receive the locking element 92 when the first and second pre-combustion chamber parts 70, 80 are assembled. In the embodiment shown in FIG. 7, the second recess 96 includes a semispherical shape corresponding to the spherical shape of the locking element 92.

As indicated in FIG. 10, the first recess 93 may include a caulked opening 98 configured to restrict the locking element 92 to fall out of the first recess 93. The caulked opening 98 may be obtained by, for example, hammering or pressing against the opening 98, thereby at least locally reducing the diameter of the opening 98.

Figure 11:
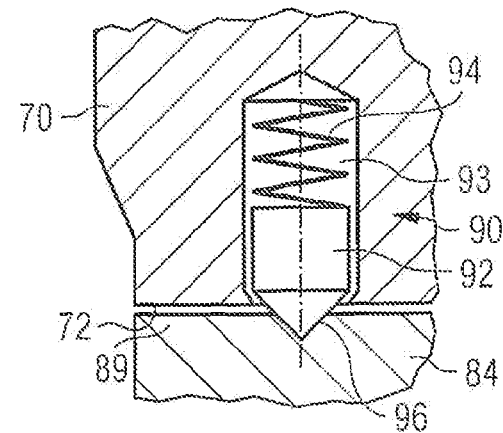
FIG. 11 is a detailed view of another embodiment of the positioning device shown in greater detail.

Referring now to FIG. 11, another embodiment of the positioning device 90 is illustrated. In the embodiment shown in FIG. 11, the locking element 92 is provided as a conical element at least partially projecting out of the first recess 93. Also in FIG. 11, the locking element 92 is pre-stressed by a tensioning member 94, such as, for instance, a spiral spring.

In the embodiment shown in FIG. 11, the second recess 96 is a conical recess substantially matching with the conical locking element 92. When the first and second pre-combustion chamber parts 70, 80 are assembled, the locking element 92 is at least partially received by the second recess 96, thereby restricting relative rotational movements between the first and second pre-combustion chamber parts 70, 80.

Figure 12:
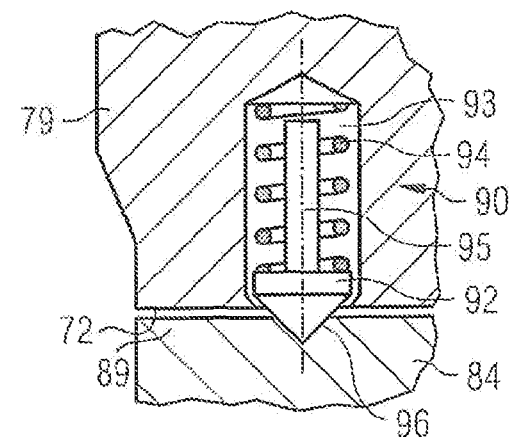
FIG. 12 is a detailed view of another embodiment of the positioning device shown in greater detail.

Referring now to FIG. 12, another embodiment of the positioning device 90 is illustrated. In the embodiment shown in FIG. 12, the locking element 92 is provided as a conical element having a stick 95 integrally extending from the locking element 92 in a direction towards the bottom of the first recess 93. The tensioning member 94, such as, for example, a spiral spring, is disposed about the stick 95 and abuts against the locking element 92 for pre-stressing the locking element 92 in a direction out of the first recess 93.

With respect to FIGS. 10 to 12, it should be understood that the positioning device 90 may be located at any suitable position, such as the positions, shown in FIGS. 3 to 6. In this respect, instead of being provided in the first pre-combustion chamber part 70, the locking element 92, the first recess 93, and the tensioning member 94 may be alternatively provided in the second pre-combustion chamber part 80. In such case, instead of being provided in the second pre-combustion chamber part 80, the second recess 96 at least partially receiving the locking element 92 may be provided in the first pre-combustion chamber part 70.

INDUSTRIAL APPLICABILITY

In the following, an exemplary method for assembling an ignition device 60 according to the present disclosure is described with respect to the drawings.

When installing the ignition device 60 into the cylinder head 24, the plurality of orifices 83 need to have a predetermined orientation with respect to, for example, the inlet and outlet valves 30. For fixing the first and second pre-combustion chamber parts 70, 80 to one another during operation of the internal combustion engine 10, the fastening device 61 may press the first and second pre-combustion chamber parts 70, 80 in a downward direction (see FIG. 2) against the flange 114. However, prior installing the ignition device 60 into the cylinder head 24, the first and second pre-combustion chamber parts 70, 80 may need to be pre-assembled. In the pre-assembling, pre-positioning of the first and second pre-combustion chamber parts 70, 80 to one another may be desired.

With reference to FIGS. 3 to 6, in a first step, the first and second pre-combustion chamber parts 70, 80 are mounted to each other by bringing the first and second threads 76, 86 into engagement. Then, with continuous screwing of the first and second pre-combustion chamber parts 70, 80, the first and second threads 76, 86 disengage each other, such that the first and second threads 76, 86 are at least partially located in the first and second thread undercuts 78, 88, respectively. In this position, the first and second pre-combustion chamber parts 70, 80 are freely rotatable to each other.

Subsequently, when rotating, for instance, the second pre-combustion chamber part 80 relative to the first pre-combustion chamber part 70, the positioning device 90 may rotationally lock the first and second pre-combustion chamber parts 70, 80 when the locking element 92 engages the second recess 96. In this assembling state, the ignition device 60 is pre-assembled with the first and second pre-combustion chamber parts 70, 80 relatively positioned to each other. The pre-assembling process may not require any specific tools. In a last step, the pre-assembled ignition device 60 is installed in the cylinder head 24 and fastened thereto by the fastening device 61.

After a predetermined time of operation of the internal combustion engine 10, the second pre-combustion chamber part 80 having the orifices 83 ignition device 60 may be worn and may need to be replaced by a newly pre-combustion chamber part. In such a maintenance event, the ignition device 60 is de-installed from the cylinder head 24. Then, the second pre-combustion chamber part 80 may easily be screwed off the first pre-combustion chamber part 70 by hand without requiring any specific tools. Subsequently, a new second pre-combustion chamber part may be mounted to the first pre-combustion chamber part 70 as set out above, also by easily screwing the second pre-combustion chamber part 80 onto the second pre-combustion chamber part 80 and automatically locking the first and second pre-combustion chamber parts 70, 80 to one another.

The first and second threads 76, 86 of the first and second pre-combustion chamber parts 70, 80, respectively, may have a standard configuration, such as, for example, a metric configuration. Hence, the first and second threads 76, 86 may not need to have a specific configuration. Additionally, in some embodiments, it might be sufficient that the first and second threads 76, 86 may have one convolution. In some embodiments, providing the first and second threads 76, 78 with a portion of a single convolution (for example, a quarter convolution) might be sufficient to assure axial locking of the first and second pre-combustion chamber parts 70, 80.

When pre-assembling the ignition device 160 according to FIGS. 7 to 9, in a first step, the first annular protrusion 174 is inserted into the second annular protrusion 184, such that the first and second juts 176, 177 engage the first and second grooves 186, 187, respectively. The second annular protrusion 184 is axially moved along the longitudinal axis 63 until the first and second juts 176, 177 get out of engagement with the first and second grooves 186, 187, respectively. Then, the first and second pre-combustion chamber parts 170, 180 are rotated to one another, until the desired position is reached and the positioning device 90 rotatably locks the first and second pre-combustion chamber parts 170, 180 to one another.

In some embodiments, the pre-combustion chamber part disclosed herein may be provided with a locking device configured to axially secure the first and second pre-combustion chamber parts 70, 80, 170, 180 to one another. For example, after disengaging each other and being positioned in the first and second thread undercuts 78, 88, respectively, the first and second threads 76, 86 may constitute the axial locking device. In some embodiments, for instance, the bayonet of FIG. 7 may constitute the axial locking device.

Although the preferred embodiments of this invention have been described herein, improvements and modifications may be incorporated without departing from the scope of the following claims.

The invention claimed is:

1. An ignition device with a pre-combustion chamber for an internal combustion engine having a plurality of cylinders, each cylinder defining a main combustion chamber, the ignition device comprising:
   a first pre-combustion chamber part configured to at least partially accommodate a spark plug, the first pre-combustion chamber part including a first thread; and
   a second pre-combustion chamber part defining at least a portion of the pre-combustion chamber and including:
      a second thread engageable with the first thread; and
      at least one orifice configured to be fluidly connected to the main combustion chamber, the second pre-combustion chamber part being detachably mountable to the first pre-combustion chamber part, such that the first and second pre-combustion chamber parts are axially secured to one another and rotatable with respect to one another when the first thread and the second thread are disengaged.

2. The ignition device of claim 1, wherein
   the first pre-combustion chamber part includes a first end flange and a first annular protrusion extending from the first end flange,
   the second pre-combustion chamber part includes a second end flange and a second annular protrusion extending from the second end flange, and
   one of the first and second annular protrusions at least partially projects into an other one of the first and second annular protrusions.

3. The ignition device of claim 2, wherein
   the first annular protrusion includes the first thread provided on a circumferential surface of the first annular protrusion, and
   the second annular protrusion includes the second thread provided on a circumferential surface of the second annular protrusion.

4. The ignition device of claim 3, wherein
   the first thread is provided at an outer circumferential surface of the first annular protrusion, and
   the second thread is provided at an inner circumferential surface of the second annular protrusion.

5. The ignition device of claim 3, wherein
   the first thread is provided at an inner circumferential surface of the first annular protrusion, and
   the second thread is provided at an outer circumferential surface of the second annular protrusion.

6. The ignition device of claim 3, wherein
   the first annular protrusion includes a first thread undercut adjacent to the first thread,
   the second annular protrusion includes a second thread undercut adjacent to the second thread, and
   the first thread at least partially projects into the second thread undercut.

7. The ignition device of claim 6, wherein
   the first thread undercut is disposed between the first thread and the first end flange, and
   the second thread undercut is disposed between the second thread and the second end flange.

8. The ignition device of claim 1, further comprising a positioning device provided at an interface between the first and second pre-combustion chamber parts and configured to inhibit rotational movement of the second pre-combustion chamber part relative to the first pre-combustion chamber part when the first and second pre-combustion chamber parts are in a pre-determined position relative to one another.

9. The ignition device of claim 8, wherein
   one of the first and second pre-combustion chamber parts includes a first recess and an other one of the first and second pre-combustion chamber parts includes a second recess, and
   the positioning device includes a locking element movably positioned within the first recess and at least partially protruding out of the first recess, the locking element at least partially matching with the second recess.

10. The ignition device of claim 9, wherein the positioning device further includes at least one tensioning device disposed within the first recess and configured to pre-stress the locking element in a direction out of the first recess and towards the second recess.

11. The ignition device of claim 9,
   wherein the locking element is a spherical locking element and the second recess is at least one of a semispherical recess or a conical recess, which at least partially matches with the spherical locking element, or
   wherein the locking element is a conical locking element and the second recess is a conical recess at least partially matching with the conical locking element.

12. The ignition device of claim 3, further comprising a positioning device provided at the annular protrusion and configured to inhibit rotational movement of the second pre-combustion chamber part relative to the first pre-combustion chamber part, when the first pre-combustion chamber part is in a pre-determined position with respect to the second pre-combustion chamber part.

13. The ignition device of claim 12, wherein the positioning device includes:
   a recess provided in an end portion of the annular protrusion, and
   a locking element movably positioned within the recess and at least partially protruding out of the recess, the locking element being configured to at least partially engage the second pre-combustion chamber part for inhibiting rotational movement between the first pre-combustion chamber part and the second pre-combustion chamber part.

14. The ignition device of claim 12, wherein the positioning device includes a recess provided in an end portion of the annular protrusion and configured to engage with a locking element configured to be movably positioned within the second pre-combustion chamber part for inhibiting rotational movement between the first pre-combustion chamber part and the second pre-combustion chamber part.

15. An engine comprising:
   a cylinder having a main combustion chamber;
   a piston slidably disposed within the main combustion chamber;
   a crankshaft;
   a connecting rod connecting the piston and the crankshaft; and
   an ignition device with a pre-combustion chamber, the ignition device including:

a first pre-combustion chamber part configured to at least partially accommodate a spark plug, the first pre-combustion chamber part including a first thread; and a second pre-combustion chamber part defining at least a portion of the pre-combustion chamber and including:

a second thread engageable with the first thread; and at least one orifice configured to be fluidly connected to the main combustion chamber, wherein the second pre-combustion chamber part is detachably mountable to the first pre-combustion chamber part, such that the first and second pre-combustion chamber parts are axially secured to one another and rotatable with respect to one another when the first thread and the second thread are disengaged.

16. The engine of claim 15, wherein
the first pre-combustion chamber part includes a first end flange a first annular protrusion extending from the first end flange,
the second pre-combustion chamber part includes a second end flange and a second annular protrusion extending from the second end flange, and
one of the first and second annular protrusions at least partially projects into an other one of the first and second annular protrusions.

17. The engine of claim 16, wherein
the first annular protrusion includes the first thread provided on a circumferential surface of the first annular protrusion, and
the second annular protrusion includes the second thread provided on a circumferential surface of the second annular protrusion.

18. The engine of claim 15, wherein the ignition device further includes a positioning device provided at an interface between the first and second pre-combustion chamber parts and configured to inhibit rotational movement of the second pre-combustion chamber part relative to the first pre-combustion chamber part when the first and second pre-combustion chamber parts are in a pre-determined position to one another.

19. An ignition device with a pre-combustion chamber for an internal combustion engine, the ignition device comprising:

a first pre-combustion chamber part configured to at least partially accommodate a spark plug, the first pre-combustion chamber part including a radial projection; and a second pre-combustion chamber part defining at least a portion of the pre-combustion chamber and including:

at least one orifice configured to be fluidly connected to a main combustion chamber of the engine; and an axial groove configured to receive the radial projection, the second pre-combustion chamber part being detachably mountable to the first pre-combustion chamber part, such that the first and second pre-combustion chamber parts are axially secured to one another and rotatable with respect to one another.

20. The ignition device of claim 19, wherein
the radial projection is a first radial projection,
the axial groove is a first axial groove,
the first pre-combustion chamber part includes a second radial projection, and
the second pre-combustion chamber part includes a second axial groove configured to receive the second axial projection.

* * * * *